United States Patent [19]

Mitchell

[11] 4,089,060

[45] May 9, 1978

[54] DIGITAL LOGARITHMIC APPARATUS

[76] Inventor: Donald K. Mitchell, 13133 E. 23 St., Tulsa, Okla. 74114

[21] Appl. No.: 732,740

[22] Filed: Oct. 15, 1976

[51] Int. Cl.² .................. G06F 15/34; H03K 3/78
[52] U.S. Cl. ..................... 364/722; 328/145; 364/701; 235/92 CA; 235/92 CC
[58] Field of Search ............... 235/150.3, 150.51, 197, 235/150.53, 92 CA, 92 DM, 92 NT, 92 CC, 92 FQ; 328/145

[56] References Cited

U.S. PATENT DOCUMENTS

| | | | |
|---|---|---|---|
| 3,436,533 | 4/1969 | Moore et al. | 235/197 |
| 3,662,163 | 5/1972 | Miller et al. | 235/150.3 |
| 3,673,391 | 6/1972 | Lougheed | 235/150.3 |
| 3,821,524 | 6/1974 | Wahl | 235/197 |
| 3,943,342 | 3/1976 | May et al. | 235/150.53 |
| 3,956,616 | 5/1976 | Knollenberg | 235/92 CC |
| 3,988,600 | 10/1976 | Katsuoka et al. | 235/150.53 |
| 3,991,301 | 11/1976 | Chaprnka | 235/150.53 |

Primary Examiner—Felix D. Gruber
Attorney, Agent, or Firm—Head, Johnson & Chafin

[57] ABSTRACT

Digital apparatus for approximating the logarithmic equation of the form: $X = W \operatorname{Log}_z(Y) + K$ where $W$ and $K$ are selected constants, employs basically a three counter, one comparator logarithmic digital calculator assembly. A source provides a selected train of time spaced pulses to a divide by N counter, which drives a first counter. The clock pulses also go to a second counter. The comparator at each clock pulse compares the counts of the first and second counters. If the count of the second counter is greater than that of the first counter, an output pulse is produced, which resets the second counter and including an output circuit.

5 Claims, 3 Drawing Figures

DIGITAL LOGARITHMIC APPARATUS

BACKGROUND OF THE INVENTION

This invention lies in the field of digital numerical calculators. More specifically, it involves a calculator for implementing equations of the form: $X = W \text{Log}_z (Y) + K$.

In present practice most of the circuits for calculating logarithmic values are analog circuits in which an amplifier has a feedback circuit to cause it to operate as a logarithmic amplifier. Because of the notoriously variable action of a transistor amplifier under various environmental conditions of temperature, voltage, etc. there is considerable drift and variation due to the environmental changes, which make the precision of such circuits less than is desired. The present invention overcomes these problems associated with analog circuits.

It is therefore an object of this invention to provide a digital electronic circuit for approximating logarithmic quantities.

SUMMARY OF THE INVENTION

Briefly, the apparatus of this invention involves a system of calculating logarithmic values by pulse rate integration in a new way. A source providing timed-spaced pulses, puts a train of pulses into a system of adders or counters and a comparator, in such a way that the integrated output series of pulses from the comparator represent the logarithm of the integrated input series of pulses. In other words, the pulse output count is proportional to the logarithm of the pulse input count. Further addition of controls such as provided by present counters, and dividing counters, permits control of the integration process to be varied in terms of three operating constants.

DESCRIPTION OF THE PREFERRED EMBODIMENT

Figure 1:
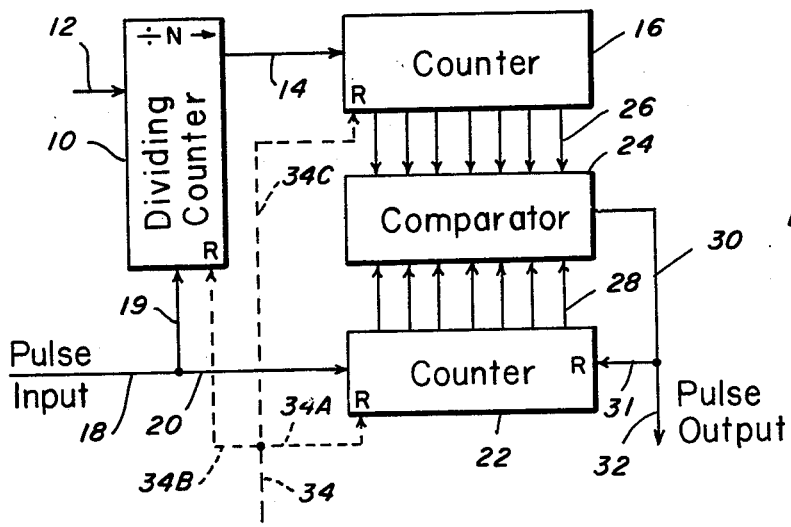
FIG. 1 illustrates a circuit for performing pulse integration, whereby the total pulse count of the output pulses, will be a logarithmic function of the total pulse count of the input pulses.

Referring now to the drawings, and in particular to FIG. 1, there is shown an electronic pulse integrating system for converting a time pulse series to a logarithmic pulse series.

Although the input pulse series is not necessarily an equal time-spaced series of pulses, it is convenient to use such an equal time-spaced series. A clock having uniformly spaced and shaped pulses, is applied to line 18. The pulses go by way of line 19 to a dividing counter 10, which can be preset to a selected value by means of a preset input 12. The total count of the counter 10 is divided by a constant N, and is fed by line 14 to first counter 16. In other words, every time counter 10 reaches the selected value N, it is reset and applies a single pulse to line 14, to operate counter 16. The value of counts at any time in counter 16 corresponds to the voltages appearing on a plurality of output leads 26, which represent in digital form, the value of count in the counter 16. This goes to a comparator 24.

A second set of inputs to the comparator 24 go by way of leads 28 from a second counter 22. Counter 22 receives from lines 18 and 20 the same pulses that go to the counter 10. Counter 22 is reset by the output of the comparator 24 to lines 30 and 31, to the reset terminal of counter 22.

In the operation of the circuit of FIG. 1, the circuit is initiated by setting counters 22, 10 and 16 to the desired initial values. For example, the initial values would be 0 for counters 22 and 16 and the initial value for counter 10 would be a value of N/2 where N is the dividing ratio of counter 10. One output pulse goes to counter 16 from counter 10 for every N counts going into counter 10. Each input pulse from line 18 increments counters 10 and 22. When counter 10 has counted up to the count of N it increments counter 16 and resets itself, and continues to count. After each time counter 22 is incremented, the comparator 24 compares the contents of counters 22 and 16.

If the reading of counter 16 is greater than the reading of counter 22, the comparator produces no output, and the circuit awaits the next input pulse. On the other hand, if the reading of counter 16 is not greater than that of counter 22, the comparator produces a pulse on line 30. This resets counter 22. The circuit then awaits the next input pulse. It will be seen by the manner in which the count of counter 16 is incremented every N counts, the frequency, or the rate of pulses produced by comparator 24 and going to the output lead 32, changes with time even though the input pulses are continuing at the same rate.

Figure 3:
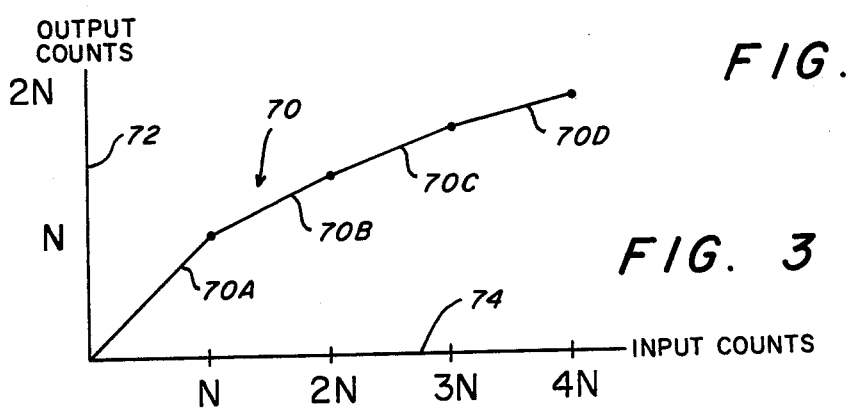
FIG. 3 illustrates the type of logarithmic curve approximated by the digital apparatus of this invention.

Such an operation is indicated, for example, in FIG. 3, where the abscissa represented by line 74 indicates the total number of counts on the input line 32, modified by a factor C. The curve 70 represents the relationship of counts output on the line 22 versus the counts put on line 18. As the value of the count in counter 16 is incremented, for the same number of input counts on 18 there are fewer pulses out of the comparator 24. Thus for the N counts from 0 to N, there are N times a constant C pulses on 30. For the interval from N to 2N, there are fewer than NC pulses, and so on.

Figure 2:
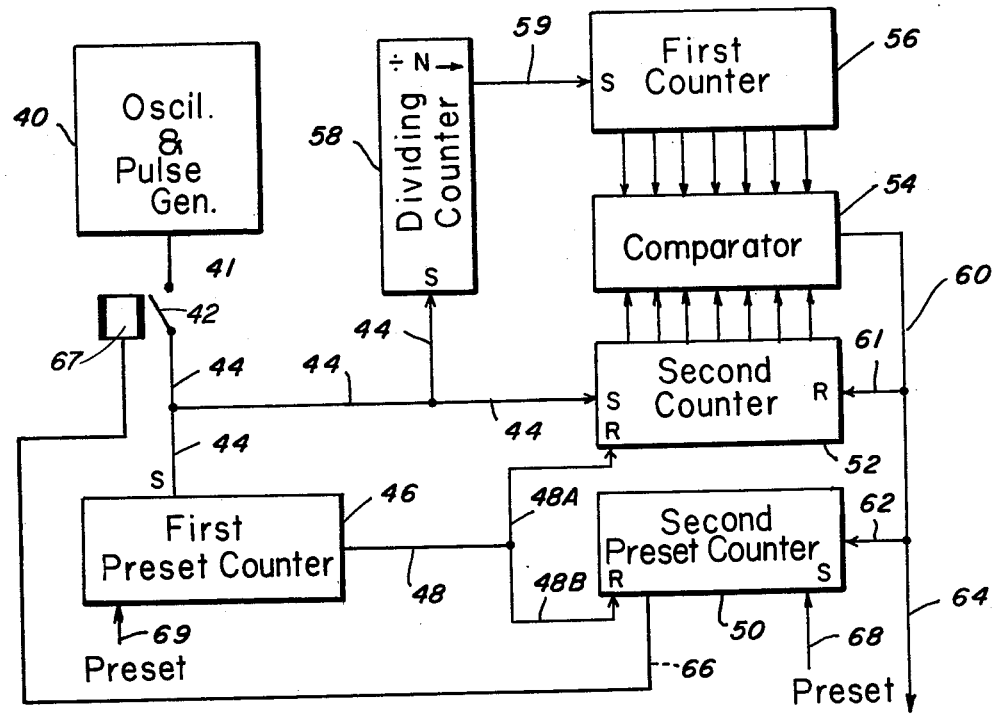
FIG. 2 illustrates a complete circuit of one embodiment of this invention.

As one example of the practical application of the circuit for computing logarithmic equations of this invention reference may be had to FIG. 2. When exposing photographic paper for printing a negative film, the desired exposure time is defined by an equation of the form:

$$D = \tfrac{1}{2} R \text{Log}_{10} (\text{exposure time}) - P/R$$

where:

- $D$ is the optical density of the negative which is measured on standard optical instruments.
- $R$ is a function of the reciprocity failure of the printing paper (for no reciprocity failure $R = 1$),
- $P$ is a constant determined by the optical system of the printer. This is determined by calibrating the printer in terms of negatives of standard densities.

It will be seen that the elements 10, 16, 24 and 22 of FIG. 1 are now numbered 58, 56, 54 and 52 respectively. The input pulses are provided by an oscillator 40, the output of which is passed through a pulse shaper to provide a clean square pulse. This goes by line 41 and switch 42 and lines 44 to a first preset counter 46, to the dividing counter 58 (corresponding to counter 10) and to the second counter 52 (corresponding to counter 22).

The output of the comparator (as in FIG. 1) goes by lines 60 and 61 to reset counter 52, in the same manner that counter 22 was reset from comparator 24. However, that output goes also to a second preset counter 50, through lead 62 as well as to lead 64 to an outside means to utilize the output of the comparator. The second preset counter 50 is normally preset to operate a circuit 66 at a selected value of count. As pulses come in through line 62 the counter counts. When it reaches the preset value, means are provided through circuit 66 to a relay, or other means 67, to open switch 42. In other words, the time during which the switch 42 is closed, that is, the time during which the preset counter 50 counts up to its preset value, represents the exposure time corresponding to the values of the constants introduced into the circuit, based upon the continuous rate of pulses coming out of the oscillator 40.

The oscillator 40 provides a series of evenly spaced pulses to provide the constant time base. The first preset counter 46 will be set to 0 at the start of the exposure and would hold counters 52 and 50 reset through leads 48, 48A, 48B, until counter 46 reaches its preset number. The purpose of this first preset counter 46 is to permit presetting counter 58 to a selected value before the operation of the entire system is initiated. In other words, counters 52 and 50 are maintained inactive until preset counter 46 reaches its preset value. Then counters 52 and 50 are free to operate in their normal manner. The preset count of counter 46 will correspond to the count in dividing counter 58 required for a negative with optical density of 0. Second counter 52 and second preset counter 50 would then be allowed to start counting. The exposure will terminate when the second preset counter 50 reaches the number it had been preset to, when it operates the relay 67 and switch 42.

The range of values that might be used in the circuit of FIG. 2 might be as follows: Assume
1. That the oscillator produces 100,000 pulses per second.
2. That the time required to print a negative with optical density 0 is 0.1 second.
3. That the time required to print a negative with optical density 1 is 1.0 second.
4. That the number preset in the counter 58 is 1,000 times the value of the optical density.

To implement this example first preset counter 46 would be preset to 10,000, and dividing counter 58 would increment the first counter 56 once for each N input pulses.

The value of N is given by the relation $$N = 1/(1-(1/z)1/w)$$

Z = 10
W = 1,000
N = 433.75

The value of N, being the divide out count of counter 58, would be 433.75 pulses. On this basis the timer would be accurate within plus or minus 0.002 units in optical density, for exposure times up to 1 second. Since an accuracy of plus or minus 0.02 units would be usable, it is seen that the accuracy of this instrument would therefore be more than adequate.

In considerable contrast to most exposure control devices, the time would be tied to a crystal or other accurate time base in the oscillator, and there would be no drift with time or temperature to cause problems.

The illustration of the circuit of FIG. 2 and the description of the circuit for photographic application is by way of example only, to show one practical application of the invention and is not intended to limit the invention to other applications.

While the source of pulses illustrated is a clock, or oscillator having constant frequency, or constant time-spacing, it will be clear that such a source is not required. In fact, FIG. 1 fails to show a specific type of source. The pulse rate can be linear, uniformly increasing or random, as desired. It can also be a function of another variable, such as a function of radioactivity, optical intensity, temperature and so on.

While the invention has been described with a certain degree of particulrity, it is manifest that many changes may be made in the details of construction and the arrangement of components. It is understood that the invention is not to be limited to the specific embodiments set forth herein by way of exemplifying the invention, but the invention is to be limited only by the scope of the attached claim or claims, including the full range of equivalency to which each element or step thereof is entitled.

What is claimed is:
1. Digital electronic apparatus having an input adapted to receive electrical pulses, and having an output for delivering electrical pulses, in which the number of output pulses X is approximately related to the number of input pulses Y in accordance with an equation of the form;

$$X = W \text{Log}_z(Y) + K$$

where
W and K are numerical constants, comprising:
(a) a source of electrical pulses;
(b) said source connected to the input of a dividing counter;
(c) said dividing counter on its output connected to a first counter, said first counter incremented by one pulse for each N pulses to said dividing counter;
(d) said source connected also to a second counter;
(e) comparator means to compare the counts of said first and second counter, and means responsive to said comparator means to generate an output pulse (on) when the count of said second counter is at least equal to the count of said first counter, and
(f) means responsive to each output pulse to reset said second counter to zero.

2. The apparatus as in claim 1 including a first preset counter which receives each pulse outputed by said comparator.

3. The apparatus as in claim 2 including means responsive to the count of said first preset counter to disconnect said source of pulses from said digital apparatus.

4. The apparatus as in claim 1 including means to count the pulses delivered by said source and by said comparator during a selected time period.

5. The apparatus as in claim 2 including second preset counter means connected to said source, and means responsive to said second preset counter to hold said second counter and said first preset counter in reset condition until said second preset counter reaches its preset value.

* * * * *